United States Patent [19]

Aliev et al.

[11] 4,237,041

[45] Dec. 2, 1980

[54] PROCESS FOR PREPARING FILM-FORMING COMPOSITION

[76] Inventors: Sakhib M. O. Aliev, ulitsa Barinova, 12, blok 4, kv. 31; Vagab S. Aliev, ulitsa Nizami, 66, blok 5, kv. 40; Magira A. K. Agaeva, ulitsa Barinova, 12, blok 4, kv. 31; Tofik A. Gadzhiev, ulitsa Malygina, 17, kv. 16; Vagif B. G. O. Guseinov, ulitsa Meskheti, 4, kv. 2; Zemfira A. B. K. Ismailova, ulitsa Bakikhanova, 26, kv. 14, all of Baku, U.S.S.R.

[21] Appl. No.: 859,869

[22] Filed: Dec. 12, 1977

[51] Int. Cl.$^3$ .............................................. C08K 5/01
[52] U.S. Cl. ........................................ 260/33.6 UA
[58] Field of Search ............... 260/33.6 A, 33.6 AQ, 260/33.6 UA, 669 P

[56] References Cited

U.S. PATENT DOCUMENTS

| 2,581,094 | 1/1952 | Gleason | 260/669 P |
| 2,586,594 | 2/1952 | Arundale | 260/669 P |

FOREIGN PATENT DOCUMENTS 1595584  1/1971  Fed. Rep. of Germany .

*Primary Examiner*—Paul R. Michl
*Attorney, Agent, or Firm*—Lackenbach, Lilling & Siegel

[57] ABSTRACT

A process for preparing a film-forming composition comprising co-oligomerization of arylalkenes with conjugated dienes at a weight ratio therebetween of from 1:1 to 4:1 respectively, at a temperature within the range of between 60° and 140° C. in a medium of a hydrocarbon solvent in the presence of a co-oligomerization initiator, that is an organic peroxide or an organic hydroperoxide, and a molecular weight control agent. The hydrocarbon solvent is a petroleum fraction boiling within the range of from 160° to 220° C., or a hydrogenate of said petroleum fraction or naphthenic hydrocarbon. The molecular weight control agent is made of products of diene condensation of conjugated dienes with cyclodienes, or a dehydrogenate of said products of diene condensation, or a fraction with a boiling range of from 160° to 220° C. recovered from liquid products gasoline pyrolysis. The process is technologically simple; non-toxic hydrocarbon solvents are used therein. The resulting film-forming composition can be simultaneously used as a synthetic drying oil and as a synthetic varnish. Coatings produced from this composition possess high physico-mechanical characteristics (good drying ability, weather fastness, chemical stability, high adherence, elasticity, mechanical strength, high dielectric properties).

17 Claims, No Drawings

PROCESS FOR PREPARING FILM-FORMING COMPOSITION

FIELD OF APPLICATION OF THE INVENTION

The present invention relates to the manufacture of synthetic film-forming materials and, more specifically, to a process for preparing a film-forming composition useful as a synthetic paint vehicle and as a synthetic varnish in the paint industry for the manufacture of paints, and as a synthetic varnish in electrical engineering for the manufacture of electroinsulating materials; in construction engineering for the production of finish materials and plates; in electronics for the manufacture of resistors, in the wood-working industry; for the manufacture of anticorrosion coatings to protect apparatus in petrochemical and oil-refining industries as well as for protection of submerged constructions.

BACKGROUND OF THE INVENTION

Known in the art is a process for preparing a film-forming composition by way of co-oligomerization of arylalkenes, such as styrene, with conjugated dienes, such as butadiene, at a weight ratio of arylalkenes to dienes of 1:4, temperature of 150° C. in a medium of a hydrocarbon solvent such as toluene, ethylbenzene, cumene or xylene taken in a 3.5-fold excess with respect to the mixture of the starting monomers, in the presence of a co-oligomerization initiator, i.e. an organic peroxide such as tert.butyl peroxide, or an organic hydroperoxide. Said hydrocarbon solvent also acts as a molecular weight control agent. From the resulting co-oligomerizate the hydrocarbon solvent and unreacted monomers are distilled off. The residue comprises a liquid low-molecular (molecular weight of from 500 to 4,000) co-oligomer of an arylalkene with a conjugated diene; the co-oligomer yield is 80% by weight of the mixture of the starting monomers. To prepare a varnish (i.e. film-forming composition) on the basis of said co-oligomer, the latter is dissolved in benzene, chloroform or dioxane.

This prior art process has a disadvantage residing in the use of toxic hydrocarbon solvents in both co-oligomerization and in the varnish preparation, wherefore the range of application of said varnish becomes limited.

Another disadvantage of the prior art process resides in the use of an excess of the above-mentioned hydrocarbon solvent with respect to the starting monomers in the co-oligomerization, wherefore the concentration of the monomers in the reaction mixture is reduced and, consequently, the rate of the co-oligomerization process is lowered.

Furthermore, the prior art process is technologically complicated, since it necessitates distilling-off the hydrocarbon solvent such as cumene from the co-oligomerizate and dissolution of the resulting co-oligomer in another toxic hydrocarbon solvent such as benzene or chloroform.

In the prior art process a high conversion degree of the starting monomers is not achieved. This results in a intolerably high content of the unreacted toxic arylalkene, e.g. styrene, in the resulting co-oligomer which, in turn, increases the toxicological properties of the varnish produced from said oligomer, wherefore the range of application of said varnish is restricted.

Owing to the use of the above-mentioned hydrocarbon solvents simultaneously serving as molecular-weight control agents in the co-oligomerization process, the resulting co-oligomers contain, as the terminal groups, fragments of the solvent with non-reactive functional groups which slow-down the process of oxidative polymerization (curing) of oligomeric films.

The use of conjugated dienes in an excess with respect to arylalkenes results in a predominating content, in the oligomeric chain, of units of conjugated dienes (compared to the arylalkene units). This causes poor drying properties in a film-forming composition (varnish) produced from such oligomers and poor adherence and weather fastness of a coating made of said composition. Due to poor drying properties, the film-forming composition based on said oligomers can be used only as a hot-drying varnish.

BRIEF SUMMARY OF THE INVENTION

It is an object of the present invention to provide a process for the preparation of a film-forming composition, wherein use could be made of a non-toxic hydrocarbon solvent.

It is another object of the present invention to provide a process which would be technologically simple.

Still another object of the present invention is to increase conversion of the starting monomers during the co-oligomerization process.

It is a further object of the present invention to provide a film-forming composition enabling the manufacture of high-quality coatings and their use as both a synthetic paint vehicle and a synthetic varnish.

These and other objects of the present invention are accomplished by a process for preparing a film-forming composition by way of co-oligomerization of arylalkenes with conjugated dienes at a temperature within the range of between 60° and 140° C. in a medium of a hydrocarbon solvent in the presence of a co-oligomerization initiator, that is an organic peroxide or an organic hydroperoxide. In accordance with the present invention, said arylalkenes and conjugated dienes are taken in a weight ratio of from 1:1 to 4:1 respectively. The hydrocarbon solvent use is made of a petroleum fraction boiling within the range of from 160° to 220° C. or a hydrogenate of said petroleum fraction or naphthene hydrocarbons. The co-oligomerization is conducted in the presence of a molecular-weight control agent, that is products of diene condensation of conjugated dienes with cyclodienes, or a dehydrogenate of said diene condensation products, or a fraction with a boiling range of from 160° to 220° C. recovered from liquid products of pyrolysis of gasoline.

In the process according to the present invention use is made of non-toxic hydrocarbon solvents which makes it possible to substantially enlarge the field of application of the film-forming composition prepared in accordance with the present invention.

Preparation of a film-forming composition by the process of the present invention is conducted in a single stage (i.e. avoided is the stage of distilling-off the solvent and the stage of a subsequent dissolution of the resulting co-oligomer in another hydrocarbon solvent), wherein the process is substantially technologically simplified.

The use of the starting monomers in the above-specified ratio as well as the use of the above-mentioned molecular-weight control agents make it possible to obtain co-oligomers of a predetermined composition with a predominating content of arylalkene units in the chains thereof and with reactive terminal groups. The film-forming composition based on such co-oligomers makes it possible to produce coating possessing good characteristics (drying capacity, weather fastness, a high adherence to a substrate, a high elasticity, impact strength).

The above-specified conditions of the co-oligomerization process (hydrocarbon solvent, molecular-weight control agent, ratio between the starting monomers) ensure a substantially complete conversion (99–99.8%) of the starting monomers. The resulting co-oligomers have a molecular weight varying within the range of between 8,000 to 14,000.

The non-toxic hydrocarbon solvent in the co-oligomerization process simultaneously acts as a solvent for the co-oligomer in the film-forming composition per se as well. Due to the above-mentioned substantially complete conversion of the starting monomers (which is of a special importance in the case of styrene), the process according to the present invention ensures the production of a non-toxic film-forming composition.

This composition is useful as a synthetic drying oil and as a synthetic varnish. This composition can be used in different fields of application (paint-and-varnish industry, electrical engineering, wood-working industry; in the manufacture of anticorrosion and electrical insulating coatings, and the like).

In the process according to the present invention the following hydrocarbon solvents should be preferably used:

(1) a petroleum fraction boiling within the range of from 160° to 220° C. which consists of 50% by weight of naphthenes, 35% by weight of paraffins, and 15% by weight of aromatic hydrocarbons;

(2) a petroleum fraction boiling within the range of from 160° to 220° C. which consists of 55% by weight of paraffins 35% by weight of naphthenes and 10% by weight of aromatic hydrocarbons;

(3) a hydrogenate of a petroleum fraction boiling within the range of from 160° to 220° C., which hydrogenate consists of 65% by weight of naphthenes and 35% by weight of paraffins;

(4) cyclopentane, methylcyclopentane, a mixture of 1,3-isopropylmethylcyclohexane and 1,4-isopropylmethylcyclohexane, methylcyclohexane or diethylcyclohexane.

As a molecular-weight control agent in the process according to the present invention it is advisable to use the following products:

(1) a product of diene condensation of butadiene with cyclopentadiene consisting of 50% by weight of tetrahydroindene, 45% by weight of vinylnorbornene and 5% by weight of a mixture of vinylcyclohexene with dicyclopentadiene;

(2) a product of diene condensation of isoprene with cyclopentadiene consisting of 45% by weight of methyltetrahydroindene, 47% by weight of 1-methyl-4-vinylnorbornene-1 and 8% by weight of a mixture of 1-methyl-4-isopropenylcyclohexene-1 with α,α'-dimethyldicyclopentadiene;

(3) a product of diene condensation of isoprene with methylcyclopentadiene consisting of 50% by weight of dimethyltetrahydroindene, 44% by weight of 1-methyl-4-isopropenylnorbornene-1 and 6% by weight of a mixture of 1-methyl-4-isopropenylcyclohexene-1- with α,α'-dimethyldicyclopentadiene;

(4) a product of diene condensation of butadiene with cyclohexadiene consisting of 55% by weight of tetrahydronaphthalene and 45% by weight of vinylcyclohexene;

(5) a dehydrogenate of a product of diene condensation of butadiene with cyclopentadiene consisting of 25% by weight of tetrahydroindene, 22.5% by weight of vinylnorbornene, 2.5% by weight of a mixture of vinylcyclohexene with dicyclopentadiene, 30% by weight of indene, 8% by weight of indane, 7% by weight of vinyltoluene and 5% by weight of tetralin;

(6) a dehydrogenate of a product of diene condensation of butadiene, isoprene and piperylene with cyclopentadiene which consists of 20% by weight of tetrahydroindene, 10% by weight of methyltetrahydroindene, 15% by weight of vinylnorbornene, 10% by weight of 1-methyl-4-minylnorbornene-1 30% by weight of indene and 15% by weight of dicyclopentadiene;

(7) a fraction with a boiling temperature within the range of between 160° to 220° C. recovered from liquid products of pyrolysis of gasoline which consists of 30% by weight of indene, 20% by weight of indane, 10% by weight of tetrahydroindene, 5% by weight of vinylnorbornene, 15% by weight of dicyclopentadiene, 5% by weight of ethyltoluene, 5% by weight of trimethylbenzene, and 10% by weight of α-methylstyrene.

In order to increase the drying rate of the film-forming composition according to the present invention, the latter can be added with a siccative in an amount of from 0.5 to 2% by weight of the co-oligomer.

The siccative can be, for example, cobalt naphthenate, manganese naphthenate, calcium stearate, or manganese stearate.

In the process according to the present invention the starting arylalkenes can be, for example, styrene, a mixture of styrene with α-methylstyrene, dichlorostyrene, vinyltoluene, vinylnaphthalene or isopropenylnaphthalene.

The starting conjugated dienes comprising comonomers of the starting arylalkenes can be, for example, butadiene, dimethylbutadiene, isoprene, a mixture of butadiene with isoprene, chloroprene or piperylene.

The co-oligomerization initiator can be, for example, tert.butyl peroxide, tert.butylperbenzoate peroxide, dicumyl peroxide, dinitrilisobutyric acid peroxide, benzoyl peroxide or cumene hydroperoxide.

DETAILED DESCRIPTION OF THE INVENTION

The process according to the present invention can be performed either continuously or periodically.

In the periodic scheme of the process, into a reactor there are charged 25 to 40% by weight of arylalkenes, 10 to 25% by weight of conjugated dienes, 40 to 60% by weight of a hydrocarbon solvent, 0.2 to 2% by weight of a co-oligomerization initiator and 3.5 to 10% by weight of a molecular weight control agent. The thus-prepared mixture is heated to a temperature within the range of from 60° to 140° C. for a period of from 20 to 40 hours. Then the reaction mixture is cooled to 40°–60° C. to give the final film-forming composition (the co-oligomer yield is as high as 99.7–99.9% by weight of the mixture of the starting monomers); this composition can be used as a synthetic drying oil or a synthetic varnish. When required, a siccative is added in the resulting composition in an amount of from 0.5 to 2% by weight of the oligomer.

However, a continuous scheme of the process is preferable. In this case, the starting reaction mixture is continuously fed into a column-type reactor at a rate ensuring a residence time of the mixture in the reactor of over 20 to 40 hours and the co-oligomerization process is conducted at a temperature of from 60° to 140° C. The final product is continuously discharged from the reactor and cooled. When required, a siccative in the above-specified amount can be added to the resulting product at the outlet of the reactor.

A hydrogenate of a petroleum fraction boiling within the range of from 160° to 220° C. employed in the process of the present invention as a hydrocarbon solvent is obtained by hydrogenation of said fraction continuously on a catalyst such as nickel or platinum at a temperature of from 160° to 180° C. and a space velocity of said fraction supply of 0.2 $hr^{-1}$.

Products of diene condensation of conjugated dienes with cyclodienes employed in the process according to the present invention as molecular-weight control agents are prepared by heating a mixture of said reagents taken in equimolar amounts over a period of from 4 to 6 hours at a temperature within the range of from 100° to 180° C. under a pressure required to conduct the reaction of condensation in a liquid phase.

The fraction with a boiling range of from 160° to 220° C. employed in the process according to the present invention as a molecular-weight control agent is prepared by pyrolysis of gasoline at a temperature within the range of from 750° to 850° C. and residence time of the reaction mixture in the reactor of from 0.5 to 30 seconds, followed by separation of said fraction from the pyrolysis products, e.g. by rectification.

A dehydrogenate of products of diene condensation of conjugated dienes with cyclodienes is employed in the process of the present invention as a molecular-weight control agent and is prepared by dehydrogenation of said product of diene condensation at a temperature within the range of from 580° to 600° C., a space velocity of the product being dehydrogenated of 0.35 to 0.5 $hr^{-1}$ in a medium of an inert diluent i.e. steam at a weight ratio of the latter to the starting feed of 2:1.

The film-forming composition prepared by the process according to the present invention is used, as it has been mentioned hereinabove, as a synthetic drying oil or a synthetic varnish. This composition comprises a colorless or a light-yellow transparent liquid with a viscosity as measured at the temperature of 20° C. in a viscosimeter of 20 to 60 seconds.

A coating produced from the film-forming composition has the following characteristics: the film-forming co-oligomer content, % by weight 34 to 65 drying capacity at 20°±2° C., hours:

| for dust | 1-2 |
| --- | --- |
| total | at most 24 |
| pendulum hardness, units | 0.15-0.4 |
| elasticity, mm | 1-3 |
| impact resistance, kg . cm | 40-50 |
| adherence to steel, by the screen-notch method | 1$_2$ |
| light-resistance, hours | 100-500 |
| water-resistance at 20 ± 2° C., hours | 10-25 |
| acid-resistance at 20 ± 2° C., hours | 3-12 |
| benzine-resistance at 20 ± 2° C., hours | 1-6 |
| oil-resistance at 20 ± 2° C., hours | 23-25 |
| electrical resisitivity, ohm . cm | 860-1,980 |
| electric strength, $MV/cm^2$ | 1.3-2.1 |
| dielectric constant | 2.43-2.68 |
| dielectric loss factor | $1.3 \times 10^{-3} - 2.3 \times 10^{-3}$ |

For a better understanding of the present invention the following Examples illustrating its specific embodiments are given hereinbelow.

EXAMPLE 1

A mixture consisting of 10% by weight of butadiene, 40% by weight of styrene, 40% by weight of a hydrocarbon solvent, i.e. a mixture of 1,3-isopropylmethylcyclohexane and 1,4-isopropylmethylcyclohexane, 2% by weight of a co-oligomerization initiator, i.e. cumene hydroperoxide, and 8% by weight of a molecular-weight control agent, i.e. a product of diene condensation of butadiene with cyclopentadiene (the diene condensation product consists of 50% by weight of tetrahydroindene, 45% by weight of vinylnorbornene and 5% by weight of a mixture of vinylcyclohexene with dicyclopentadiene) is heated to a temperature of 60° C. and then for 10 hours the temperature is elevated to 120° C., whereafter the temperature is again raised to 140° C. over 10 hours. The resulting co-oligomerizate comprising a solution of a co-oligomer of butadiene with styrene in the above-mentioned hydrocarbon solvent is cooled and a siccative, cobalt naphthenate, is added thereto in the amount of 1% by weight of the co-oligomer. As a result, a film-forming composition is obtained which is useful as a synthetic drying oil or a synthetic varnish (the co-oligomer yield is equal to 99% by weight of the mixture of the starting monomers at the conversion of 99% by weight).

The drying oil or varnish prepared by the process described hereinabove is applied onto a glass or metal surface. The coating is thus obtained which has the following characteristics:

| the content of the film-forming co-oligomer, wt. % | 49 |
| --- | --- |
| drying capacity at 20 ± 2° C., hours: | |
| for dust | 1 |
| total | 23 |
| pendulum hardness, units | 0.15 |
| elasticity, mm | 1 |
| impact resistance, kg . cm | 50 |
| adherence to steel, by the screen-notch method | 1$_2$ |
| light-resistance, hours | 100 |
| water-resistance at 20 ± 2° C., hours | 10 |
| acid-resistance at 20 ± 2° C., hours | 4 |
| benzine-resistance at 20 ± 2° C., hours | 5 |
| oil-resistance at 20 ± 2° C., hours | 24. |

EXAMPLE 2

A mixture consisting of 10% by weight of piperylene, 25% by weight of styrene, 59.8% by weight of a hydrocarbon solvent, i.e. a petroleum fraction boiling within the range of between 160° and 220° C. (said fraction consists of 50% by weight of naphthenes, 35% by weight of paraffins, and 15% by weight of aromatic hydrocarbons), 0.2% by weight of a co-oligomerization initiator, i.e. tert.butyl peroxide and 5% by weight of a molecular-weight control agent, i.e. a product of diene condensation of butadiene with cyclopentadiene (of the composition as described in the foregoing Example 1) is heated to the temperature of 80° C., whereafter the temperature is elevated to 130° C. over 5 hours and then to 140° C. for 35 hours. The resulting co-oligomerizate comprising a solution of a co-oligomer of butadiene with styrene in the above-mentioned solvent is cooled and added with a siccative, i.e. manganese stearate in the amount of 1.5% by weight of the co-oligomer weight. As a result, a film-forming composition is obtained which is used as a synthetic drying oil or a synthetic oil (the yield of the co-oligomer is equal to 99% by weight of the mixture of the starting monomers, the conversion being equal to 99.2% by weight).

The resulting coating has the following characteristics

| the content of the film-forming co-oligomer, wt. % | 34 |
|---|---|
| drying capacity at 20 ± 2° C., hours: | |
| for dust | 1.5 |
| total | 12 |
| pendulum hardness, units | 0.35 |
| elasticity, mm | 1 |
| impact resistance, kg . cm | 40 |
| adherence to steel, by the screen-notch method | 1$_2$ |
| light-resistance, hours | 400 |
| water-resistance at 20 ± 2° C., hours | 24 |
| acid-resistance at 20 ± 2° C., hours | 8 |
| benzine-resistance at 20 ± 2° C., hours | 5 |
| oil-resistance at 20 ± 2° C., hours | 24. |

EXAMPLE 3

A mixture consisting of 25% by weight of dimethylbutadiene, 25% by weight of styrene, 40% by weight of a hydrocarbon solvent, i.e. a petroleum fraction boiling within the range of from 160° to 220° C. (said fraction consists of 55% by weight of paraffins, 35% by weight of naphthenes and 10% by weight of aromatic hydrocarbons), 1% by weight of a co-oligomerization initiator, i.e. tert.butyl perbenzoate peroxide, and 9% by weight of a molecular-weight control agent, i.e. a product of diene condensation of isoprene with cyclopentadiene (said diene condensation product consists of 45% by weight of methyltetrahydroindene, 47% by weight of 1-methyl-4-vinylnorbornene-1 and 8% by weight of a mixture of 1-methyl-4-isopropenylcyclohexene-1 with α,α'-dimethyldicyclopentadiene), is treated following the procedure described in the foregoing Example 2. The resulting co-oligomerizate comprising a solution of a co-oligomer of dimethylbutadiene with styrene in the above-mentioned solvent is cooled to give a film-forming composition useful as a synthetic paint vehicle or a synthetic varnish (the co-oligomer yield is equal to 99.5% by weight of the mixture of the starting monomers, the conversion being equal to 99.8% by weight).

The thus-produced coating has the following properties:

| to content of the film-forming co-oligomer, wt. % | 50 |
|---|---|
| drying capacity at 20 ± 2° C., hours: | |
| for dust | 2 |
| total | 20 |
| pendulum hardness, units | 0.15 |
| elasticity, mm | 1 |
| impact resistance, kg . cm | 50 |
| adherence to steel, by the screen-notch method | 1$_2$ |
| light-resistance, hours | 500 |
| water-resistance at 20 ± 2° C., hours | 25 |
| acid-resistance at 20 ± 2° C., hours | 12 |
| benzine-resistance at 20 ± 2° C., hours | 1 |
| oil-resistance at 20 ± 2° C., hours | 24. |

EXAMPLE 4

A mixture consisting of 25% by weight of butadiene, 40% by weight of styrene, 30% by weight of a hydrocarbon solvent, i.e. a petroleum fraction boiling within the range of between 160° and 220° C. (the composition of this petroleum fraction is specified in the foregoing Example 2), 1.5% by weight of a co-oligomerization initiator, i.e. cumene hydroperoxide, and 3.5% by weight of a molecular-weight control agent, i.e. a fraction with a boiling range of from 160° to 220° C. recovered from liquid products of gasoline pyrolysis (said fraction consists of 30% by weight of indene, 20% by weight of indane, 10% by weight of tetrahydroindene, 5% by weight of vinylnorbornene, 15% by weight of dicyclopentadiene, 5% by weight of ethyltoluene, 5% by weight of trimethylbenzene and 10% by weight of α-methylstyrene) is treated following the procedure described in Example 1 hereinbefore. The resulting co-oligomerizate comprising a solution of a co-oligomer of butadiene with styrene in the above-mentioned solvent is cooled and added with a siccative, i.e. manganese naphthenate in the amount of 2% by weight of the co-oligomer. As a result, a film-forming composition is obtained which is useful as a synthetic paint vehicle or a synthetic varnish (the yield of the co-oligomer is equal to 99% by weight of the mixture of the starting monomers, the conversion being equal to 99.3% by weight).

The resulting coating has the following properties:

| content of the film-forming co-oligomer, wt. % | 65 |
|---|---|
| drying capacity at 20 ± 2° C., hours: | |
| for dust | 2 |
| total | 16 |
| pendulum hardness, units | 0.25 |
| elasticity, mm | 1 |
| impact resistance, kg . cm | 45 |
| adherence to steel, by the screen-notch method | 1$_2$ |
| light-resistance, hours | 450 |
| water-resistance, at 20 ± 2° C., hours | 24 |
| acid-resistance at 20 ± 2° C., hours | 10 |
| benzine-resistance at 20 ± 2° C., hours | 30 |
| oil-resistance at 20 ± 2° C., hours | 24. |

EXAMPLE 5

A mixture consisting of 12.5% by weight of isoprene, 37.5% by weight of vinyltoluene, 40% by weight of a hydrocarbon solvent, i.e. diethylcyclohexane, 1% by weight of a co-oligomerization initiator, i.e. cumene hydroperoxide, and 9% by weight of a molecular-weight control agent, i.e. a product of diene condensation of isoprene with methylcyclopentadiene (this product of diene condensation consists of 50% by weight of dimethyltetrahydroindene, 44% by weight of 1-methyl-4-isopropenylnoborrnene-1 and 6% by weight of a mixture of 1-methyl-4-isopropenylcylohexene-1 with α,α'-dimethyldicyclopentadiene) is treated under the conditions described in Example 1 hereinabove. The resulting co-oligomerizate comprising a solution of a co-oligomer of isoprene with vinyltoluene in said solvent is cooled and added with a siccative, i.e. manganese naphthenate in the amount of 2% by weight of the co-oligomer. As a result a film-forming composition is obtained useful as a synthetic paint vehicle or a synthetic varnish (the yield of the co-oligomer is equal to 99.2% by weight of the mixture of the starting monomers, the conversion being equal to 99.7% by weight).

The resulting coating has the following properties:

| content of the film-forming co-oligomer, wt. % | 49 |
|---|---|
| drying capacity at 20 ± 2° C., hours: | |
| for dust | 1 |
| total | 10 |
| pendulum hardness, units | 0.3 |

| | |
|---|---|
| elasticity, mm | 3 |
| impact resistance, kg . cm | 40 |
| adherence to steel, by the screen-notch method | 1₂ |
| light-resistance, hours | 350 |
| water-resistance at 20 ± 2° C., hours | 20 |
| acid-resistance at 20 ± 2° C., hours | 4 |
| benzine-resistance at 20 ± 2° C., hours | 5 |
| oil-resistance at 20 ± 2° C., hours | 24. |

EXAMPLE 6

A mixture consisting of 7.5% by weight of butadiene, 5% by weight of isoprene, 25% by weight of styrene, 12.5% by weight of α-methylstyrene, 40% by weight of a hydrocarbon solvent, i.e. a hydrogenate of a petroleum fraction boiling within the range of between 160° and 220° C. (said hydrogenate consists of 65% by weight of naphthenes and 35% by weight of paraffins), 2% by weight of a co-oligomerization initiator, i.e. cumene hydroperoxide and 8% by weight of a molecular weight control agent, i i.e. a dehydrogenate of a product of diene condensation of butadiene with cyclopentadiene (the composition of the diene condensation product is given in Example 1 hereinbefore) the dehydrogenate consists of 25% by weight of tetrahydroindene, 22.5% by weight of vinylnorbornene, 2.5% by weight of a mixture of vinylcyclohexene with dicyclopentadiene, 30% by weight of indene, 8% by weight of indane, 7% by weight of vinyltoluene and 5% by weight of tetralin) is continuously fed into a co-oligomerization column-type reactor at a rate ensuring the residence time of the reaction mixture in the reactor equal to 23 hours. The process is conducted at the temperature of 120° C. At the outlet of the reactor, into a co-oligomerizate comprising a solution of a co-oligomer of butadiene, isoprene, styrene and α-methylstyrene in the above-mentioned solvent continuously added is a siccative, i.e. calcium stearate in the amount of 0.5% by weight of the co-oligomer. As a result, a film-forming composition is obtained which is useful as a synthetic paint vehicle or a synthetic varnish (the yield of the co-oligomer is equal to 99% by weight of the mixture of the starting monomers, the conversion being equal to 99.4% by weight).

The coating has the following properties:

| | |
|---|---|
| content of the film-forming co-oligomer, wt. % | 49 |
| drying capacity at 20 ± 2° C., hours: | |
| for dust | 1 |
| total | 5 |
| pendulum hardness, units | 0.4 |
| elasticity, mm | 3 |
| impact resistance, kg . cm | 40 |
| adherence to steel, by the screen-notch method | 1₂ |
| light-resistance, hours | 350 |
| water-resistance at 20 ± 2° C., hours | 20 |
| acid-resistance at 20 ± 2° C., hours | 4 |
| benzine-resistance at 20 ± 2° C., hours | 5 |
| oil-resistance at 20 ± 2° C., hours | 24. |

EXAMPLE 7

A mixture of 45% by weight of a hydrocarbon solvent, i.e. cyclopentane and 7% by weight of a molecular-weight control agent, i.e. a fraction with a boiling temperature within the range of from 160° to 220° C. recovered from liquid products of pyrolysis of gasoline (the composition of this fraction is given in the foregoing Example 4) is heated to the temperature of 130° C. for 6 hours. The heated reaction mixture is added with a mixture of 47% by weight of the starting monomers (12.5% by weight of chloroprene and 34.5% by weight of dichlorostyrene) with 1% by weight of a co-oligomerization initiator i.e. dicumyl peroxide. The added mixture is fed at the rate ensuring the co-oligomerization temperature of 140° C. The resulting co-oligomerizate is maintained at the temperature of 140° C. for 20 hours and then cooled to give a film-forming composition useful as a synthetic paint vehicle and as a synthetic varnish (the yield of the co-oligomer is equal to 99.4% by weight of the mixture of the starting monomers, the conversion being equal to 99.7% by weight).

The resulting coating has properties similar to those presented in Example 6 hereinbefore (the content of the film-forming agent is 46% by weight).

EXAMPLE 8

A mixture consisting of 11% by weight of butadine, 30% by weight of vinylnaphthalene, 48% by weight of a hydrocarbon solvent, i.e. cyclohexane, 1% by weight of a co-oligomerization initiator, i.e. benzoyl peroxide, and 10% of a molecular-weight control agent, i.e. dehydrogenate of a product of diene condensation of butadiene, isoprene and piperylene with cyclopentadiene (said dehydrogenate consists of 20% by weight of tetrahydroindroindene, 10% by weight of methyltetrahydroindene, 15% by weight of vinylnorbornene, 10% by weight of 1-methyl-4-vinylnorbornene-1, 30% by weight of indene and 15% by weight of dicyclopentadiene) is continuously fed into a column-type co-oligomerization reactor at a rate ensuring the residence time of the mixture in the reactor equal to 25 hours. The process is conducted at the temperature of 130° C. The reaction mixture, i.e. co-oligomerizate comprising a solution of a co-oligomer of butadiene with vinylnaphthalene in said solvent is cooled. As a result, a film-forming composition is obtained (the yield of the co-oligomer is equal to 99.5% by weight of the mixture of the starting monomers, the conversion being 99.8% by weight) which is used for the manufacture of a coating having the following properties:

| | |
|---|---|
| content of the film-forming co-oligomer, wt. % | 40 |
| drying capacity at 20 ± 2° C., hours: | |
| for dust | 1 |
| total | 15 |
| pendulum hardness, units | 0.4 |
| elasticity, mm | 3 |
| impact resistance, kg . cm | 40 |
| adherence to steel, by the screen-notch method | 1₂ |
| light-resistance, hours | 350 |
| water-resistance at 20 ± 2° C., hours | 20 |
| acid-resistance at 20 ± 2° C., hours | 4 |
| benzine-resistance at 20 ± 2° C., hours | 5 |
| oil-resistance at 20 ± 2° C., hours | 25. |

EXAMPLE 9

A mixture consisting of 10% by weight of dimethylbutadiene, 40% by weight of isopropenylnaphthalene, 40% by weight of a hydrocarbon solvent, i.e. methylcyclohexane, 9% by weight of a molecular-weight control agent, i.e. a fraction with a boiling range of from 160° to 220° C. recovered from liquid products of pyrolysis of gasoline (the composition of said fraction is given in Example 4 hereinbefore) and 1% by weight of a co-oligomerization initiator, i.e. dinitrilazoisobutyric acid peroxide, is continuously fed into a column-type reactor for co-oligomerization at a supply rate ensuring the residence time of the reaction mixture in the reactor of 30 hours. The process is conducted at the temperature of 80° C. The co-oligomerizate, comprising a solution of a co-oligomer of dimethylbutadiene with isopropenylnaphthalene in the above-mentioned solvent is cooled. The resulting film-forming composition is useful as a synthetic paint vehicle and as a synthetic varnish (the yield of the co-oligomer is equal to 99.3% by weight of the mixture of the starting monomers, the conversion being equal to 99.6% by weight).

The resulting coating has the following properties:

| | |
|---|---|
| content of the film-forming co-oligomer, wt. % | 49 |
| drying capacity at 20 ± 2° C., hours: | |
| for dust | 1.5 |
| total | 17 |
| pendulum hardness, units | 0.3 |
| elasticity, mm | 3 |
| impact strength, kg . cm | 45 |
| adherence to steel, by the screen-notch method | 1$_2$ |
| light-resistance, hours | 340 |
| water-resistance at 20 ± 2° C., hours | 21 |
| acid-resistance at 20 ± 2° C., hours | 3 |
| benzine-resistance at 20 ± 2° C., hours | 4 |
| oil-resistance at 20 ± 2° C., hours | 23. |

EXAMPLE 10

A mixture consisting of 10% by weight of butadiene, 40% by weight of styrene, 42% by weight of a hydrocarbon solvent, i.e. methylcyclopentane, 2% by weight of a co-oligomerization initiator, i.e. cumene hydroperoxide, and 6% by weight of a molecular-weight control agent, i.e. a product of diene condensation of butadiene with cyclohexadiene (the condensation product consists of 55% by weight of tetrahydronaphthalene and 45% by weight of vinylcyclohexane) is continuously fed into a column-type co-oligomerization reactor at a rate ensuring the residence time of the reaction mixture in the reactor of 28 hours. The process is conducted at the temperature of 110° C. The reaction mixture, i.e. a co-oligomerizate comprising a solution of a co-oligomer of butadiene with styrene in the above-mentioned solvent is then cooled to give a film-forming composition (the yield of the co-oligomer is equal to 99.1% by weight of the mixture of the starting monomers, the conversion being equal to 99.4% by weight) useful as a synthetic paint vehicle or a synthetic varnish.

The coating produced from this film-forming composition has the following properties:

| | |
|---|---|
| content of the film-forming agent, wt. % | 49 |
| drying capacity at 20 ± 2° C., hours: | |
| for dust | 2 |
| total | 14 |
| pendulum hardness, units | 0.3 |
| elasticity, mm | 1 |
| impact resistance, kg . cm | 50 |
| adherence to steel, by the screen-notch method | 1$_2$ |
| light-resistance, hours | 350 |
| water-resistance at 20 ± 2° C., hours | 24 |
| acid resistance at 20 ± 2° C., hours | 9 |
| benzine-resistance at 20 ± 2° C., hours | 6 |
| oil-resistance at 20 ± 2° C., hours | 24. |

What is claimed is:

1. A process for preparing a film-forming composition comprising co-oligomerization of arylalkenes with conjugated dienes at a weight ratio therebetween of from 1:1 to 4:1, respectively at a temperature ranging from 60° to 140° C. in a medium of a non-toxic hydrocarbon solvent selected from the group consisting of
    (a) a petroleum fraction boiling within the range of 160° to 220° C. consisting of naphthenes, paraffins and aromatic hydrocarbons;
    (b) a hydrogenate of a petroleum fraction boiling within the range of 160° to 220° C. obtained by catalytic hydrogenation at a temperature of 160°–180° C.; and
    (c) naphthene hydrocarbons;
in the presence of a co-oligomerization initiator selected from the group consisting of organic peroxides and organic hydroperoxides; and in the presence of a molecular-weight control agent selected from the group consisting of
    (i) products of diene condensation of conjugated dienes with cyclodienes,
    (ii) a dehydrogenate of said products of diene condensation, and
    (iii) a fraction with a boiling range between 160° and 220° C. recovered from liquid products of pyrolysis of gasoline at a temperature of 750°–850° C.,
whereby solvent removal and subsequent dissolution of the resulting co-oligomer is avoided.

2. A process as claimed in claim 1, wherein use is made of arylalkenes selected from the group consisting of styrene, a mixture of styrene with α-methylstyrene; dichlorostyrene, vinyltoluene, vinylnaphthalene and isopropenylnaphthalene.

3. A process as claimed in claim 1, wherein use is made of conjugated dienes selected from the group consisting of butadiene, dimethylbutadiene, isoprene, a mixture of butadiene with isoprene; chloroprene and piperylene.

4. A process as claimed in claim 1, wherein as the hydrocarbon solvent use is made of a petroleum fraction boiling within the range of between 160° and 220° C. and consisting of 50% by weight of naphthenes, 35% by weight of paraffins and 15% by weight of aromatic hydrocarbons.

5. A process as claimed in claim 1, wherein as the hydrocarbon solvent use is made of a petroleum fraction boiling within the range of between 160° and 220° C. which consists of 55% by weight of paraffins, 35% by weight of naphthenes and 10% by weight of aromatic hydrocarbons.

6. A process as claimed in claim 1, wherein as the hydrocarbon solvent use is made of a hydrogenate of a petroleum fraction boiling within the range of between 160° and 220° C. which consists of 65% by weight of naphthenes and 35% by weight of paraffins.

7. A process as claimed in claim 1, wherein as the hydrocarbon solvent use is made of naphthene hydrocarbons selected from the group consisting of cyclopentane, methylcyclopentane, a mixture of 1,3-isopropylmethylcyclohexane and 1,4-isopropylmethylcyclohexane, methylcyclohexane and diethhylcyclohexane.

8. A process as claimed in claim 1, wherein as the molecular-weight control agent use is made of a product of diene condensation of butadiene with cyclopentadiene consisting of 50% by weight of tetrahydroindene, 45% by weight of vinylnorbornene, and 5% by weight of a mixture of vinylcyclohexane with dicyclopentadiene.

9. A process as claimed in claim 1, wherein as the molecular-weight control agent use is made of a product of diene condensation of isoprene with cyclopentadiene which consists of 45% by weight of methyltetrahydroindene, 47% by weight of 1-methyl-4-vinylnorbornene-1 and 8% by weight of a mixture of 1-methyl-4-isopropenylcyclohexene-1 with α,α'-dimethyldicyclopentadiene.

10. A process as claimed in claim 1, wherein as the molecular-weight control agent use is made of a product of diene condensation of isoprene with methylcyclopentadiene consisting of 50% by weight of dimethyltetrahydroindene, 44% by weight of 1-methyl-4-isopropenylnorbornene-1 and 6% by weight of a mixture of 1-methyl-4-isopropenylcyclohexene-1 with, α,α'-dimethyldicyclopentadiene.

11. A process as claimed in claim 1, wherein as the molecular-weight control agent use is made of a product of diene condensation of butadiene with cyclohexadiene consisting of 55% by weight of tetrahydronaphthalene and 45% by weight of vinylcyclohexene.

12. A process as claimed in claim 1, wherein as the molecular-weight control agent use is made of a dehydrogenate of a product of diene condensation of butadiene with cyclopentadiene which consists of 25% by weight of tetrahydroindene 22.5% by weight of vinylnorbornene, 2.5% by weight of a mixture of vinylcyclohexene with dicyclopentadiene, 30% by weight of indene, 8% by weight of indane, 7% by weight of vinyltoluene and 5% by weight of tetralin.

13. A process as claimed in claim 1, wherein as the molecular-weight control agent use is made of a dihydrogenate of a product of diene condensation of butadiene, isoprene and piperylene with cyclopentadiene which consists of 20% by weight of tetrahydroindene, 10% by weight of methyltetrahydroindene, 15% by weight of vinylnorbornene, 10% by weight of 1-methyl-4-vinylnorbornene-1, 30% by weight of indene and 15% by weight of dicyclopentadiene.

14. A process as claimed in claim 1, wherein as the molecular-weight control agent use is made of a fraction with the boiling range of between 160° and 220° C. recovered from liquid products of pyrolysis of gasoline which consists of 30% by weight of indene, 20% by weight of indane, 10% by weight of tetrahydroindene, 5% by weight of vinylnorbornene, 15% by weight of dicyclopentadiene, 5% by weight of ethyltoluene, 5% by weight of trimethylbenzene and 10% by weight of α-methylstyrene.

15. A process as claimed in claim 1, wherein use is made of a co-oligomerization initiator selected from the group consisting of tert.butyl peroxide, tert.butylperbenzoate peroxide, dicumyl peroxide, dinitrilazoisobutyric acid peroxide, benzoyl peroxide and cumene hydroperoxide.

16. A process as claimed in claim 1, wherein into the film-forming composition a siccative is added in an amount ranging from 0.5 to 2% by weight of the co-oligomer.

17. A process as claimed in claim 16, wherein as the siccative use is made of a compound selected from the group consisting of cobalt naphtnehate, manganese naphthenate, calcium stearate and manganese stearate.

* * * * *